(12) United States Patent
Aarras et al.

(10) Patent No.: US 8,205,170 B2
(45) Date of Patent: Jun. 19, 2012

(54) ELECTRONIC DEVICES

(75) Inventors: Mikko Aarras, Helsinki (FI); Niilo Alfthan, Tampere (FI); Simon Bradford, Middlesex (GB); Claus Allan Christensen, København (DK); Anthony Dalby, London (GB); Axel E. Meyer, Helsinki (FI); William Sermon, Buckinghamshire (GB); Sameer Shirgaonkar, London (GB); Crispian (Pip) Tompkin, Los Angeles, CA (US); Chee Wong, Helsinki (FI)

(73) Assignee: Nokia Corporation, Espoo (FI)

( * ) Notice: Subject to any disclaimer, the term of this patent is extended or adjusted under 35 U.S.C. 154(b) by 777 days.

(21) Appl. No.: 11/424,042

(22) Filed: Jun. 14, 2006

(65) Prior Publication Data

US 2007/0294633 A1   Dec. 20, 2007

(51) Int. Cl.
*G06F 3/048* (2006.01)
*G06F 3/14* (2006.01)
*H04M 1/00* (2006.01)
*G09G 5/00* (2006.01)

(52) U.S. Cl. ........ 715/831; 715/821; 715/863; 715/864; 455/575.4; 345/169

(58) Field of Classification Search .................. 715/864, 715/810, 821, 826, 831–833, 863; 455/575, 455/4, 575.4, 556.1–556.2, 557; 345/169, 345/172, 184
See application file for complete search history.

(56) References Cited

U.S. PATENT DOCUMENTS

| | | | |
|---|---|---|---|
| 6,282,436 B1 * | 8/2001 | Crisp ......................... | 455/575.4 |
| 6,434,371 B1 * | 8/2002 | Claxton ...................... | 455/90.1 |
| 7,069,056 B2 * | 6/2006 | Iwata et al. .................... | 455/566 |
| 7,107,018 B2 * | 9/2006 | Jellicoe ........................ | 455/90.3 |
| 7,474,298 B2 * | 1/2009 | Nguyen et al. ................ | 345/169 |
| 2003/0008679 A1 | 1/2003 | Iwata et al. | |
| 2003/0210224 A1 * | 11/2003 | Bartholomew et al. ........ | 345/156 |
| 2005/0017953 A1 * | 1/2005 | Pekka ........................... | 345/169 |
| 2005/0032557 A1 | 2/2005 | Brunstrom et al. | |
| 2005/0124398 A1 | 6/2005 | Lee et al. | |
| 2006/0005131 A1 | 1/2006 | Tao | |
| 2006/0009255 A1 * | 1/2006 | Vuolteenaho .............. | 455/556.1 |
| 2007/0161418 A1 * | 7/2007 | Chen et al. ................. | 455/575.4 |
| 2009/0051658 A1 * | 2/2009 | Frohlund ...................... | 345/169 |

FOREIGN PATENT DOCUMENTS

| | | |
|---|---|---|
| EP | 1 298 909 | 4/2003 |
| EP | 1 542 435 | 6/2005 |
| WO | 2006/108548 | 10/2006 |

OTHER PUBLICATIONS

European Search Report (Application No. 07252280.8-2414) dated Aug. 3, 2010, 8 pages.

* cited by examiner

*Primary Examiner* — William Bashore
*Assistant Examiner* — Andrew Tank
(74) *Attorney, Agent, or Firm* — Alston & Bird LLP

(57) ABSTRACT

A portable electronic apparatus arranged to be able to perform a plurality of functions, one or more of a plurality of functions being selectively performable when the apparatus is placed in a corresponding functional mode, the apparatus having a user interface to allow user operation of the plurality of functions, each of the functions being user operable using a particular region of the electronic apparatus user interface, the apparatus comprising a user moveable cover arranged to be moveable into a plurality of positions, wherein each of the cover positions is associated with a particular functional mode of the apparatus and is arranged to cover one or more regions of the user interface not associated with the particular functional mode and to reveal one or more regions of the user interface associated with the particular functional mode.

26 Claims, 2 Drawing Sheets

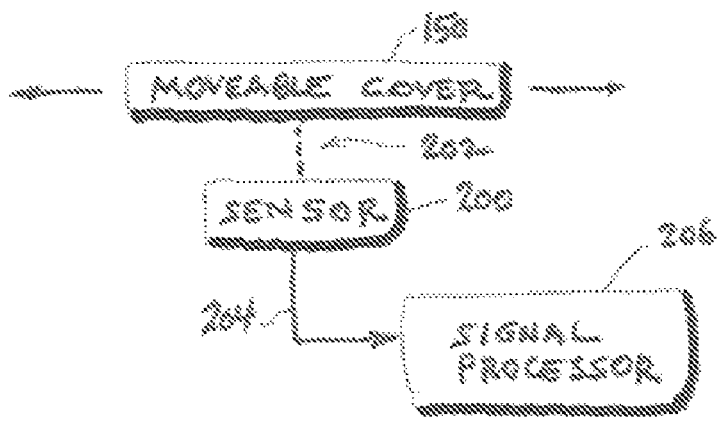
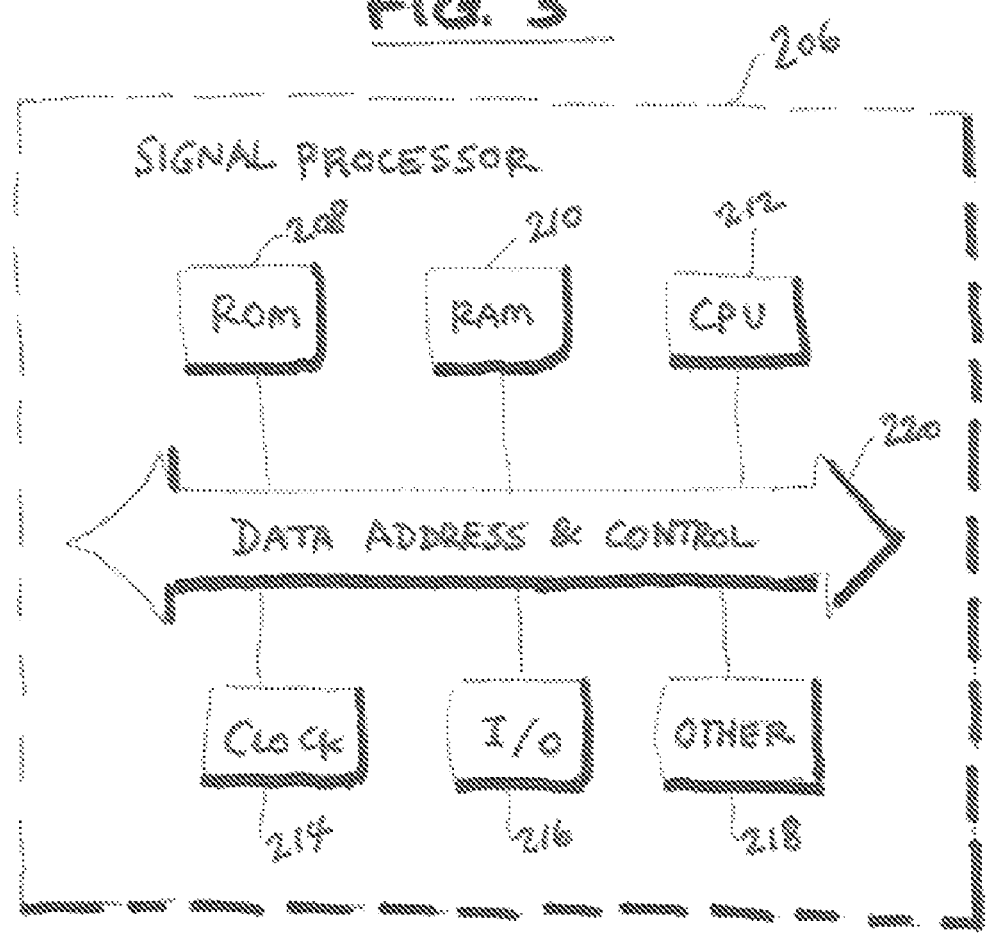

ELECTRONIC DEVICES

BACKGROUND OF THE INVENTION

The invention relates to the field of electronic devices, in particular portable electronic devices which may be hand-held in use. Although hand-held electronic devices may be hand-held in use, such devices do not necessarily need to be hand-held for use. The invention also relates to user interfaces for such devices and associated apparatus and computer code.

Portable electronic devices are becoming increasingly complex, being able to perform a number of different functions. The functions include for example, radiotelephone functionality, camera functionality, and audio functionality amongst others. These functions are user operable by means of a user interface. Such user interfaces can seem confusing to a user.

The functionality may operate one or more electronic device hardware elements, for example, antenna, speakers, camera assemblies, etc., and/or processors associated with such hardware elements. The various functions may or may not share one or more hardware elements.

BRIEF SUMMARY OF THE INVENTION

A portable electronic apparatus arranged to be able to perform a plurality of functions, one or more of a plurality of functions being selectively performable when the apparatus is placed in a corresponding functional mode, the apparatus having a user interface to allow user operation of the plurality of functions, each of the functions being user operable using a particular region of the electronic apparatus user interface, the apparatus comprising a user moveable cover arranged to be moveable into a plurality of positions, wherein each of the cover positions is associated with a particular functional mode of the apparatus and is arranged to cover one or more regions of the user interface not associated with the particular functional mode and to reveal one or more regions of the user interface associated with the particular functional mode.

Thus, regions of the user interface which are not useable (or not readily useable) in a particular functional mode are covered by the cover and thus operation of these regions is inhibited. This simplifies the user interface for a user.

The apparatus may be arranged such that each region of the user interface is associated with a single functional mode.

The cover may be slideable along a sliding axis, the sliding axis being aligned with an axis of the apparatus. The axis of the apparatus may be the longitudinal axis of the apparatus.

The cover may be slideable in the plane parallel to a face of the apparatus. The face may be the front face.

The apparatus user interface may comprise an alphanumeric keypad region, a Qwerty keypad region and a display region each positioned on an apparatus face adjacent to one another. The regions may be positioned adjacent to one another along the sliding axis of the cover.

The apparatus may be arranged such that movement of the cover to or toward a position which reveals a particular region of the user interface initiates a signal to place the apparatus into the functional mode associated with the particular revealed user interface region.

The apparatus may be arranged such that movement of the cover to a position which reveals a plurality of regions of the user interface initiates a signal to place the apparatus into an operational mode from which a user can select which one of the associated functions the user wishes to select. The user is thus given the option to select a particular functional mode.

The cover may comprise one or more user input elements arranged to be useable by the user in a plurality of functional modes of the apparatus. One or more of the user input elements may provide user scrolling and/or selection of one or more menu items on a display. The apparatus may integrally comprise the display and/or be arranged to be connectable to a remote display.

The cover may comprise one or more user output elements. The user output elements may be one or more displays. The apparatus may be arranged such that the output on one or more of the user output elements may be adapted to be associated with the functional mode of the apparatus. Thus, in the camera mode, a display on the cover may display the image to be captured and, in the audio mode, the display may provide a visual indication of the item of audio being played.

The cover user input elements may be one or more touch sensitive displays. The apparatus may be arranged such that the image on one or more of the touch sensitive displays may be arranged to be associated with the functional mode of apparatus. Thus, the touch sensitive display may indicate a number of user selectable options in the camera mode and a different set of user selectable options in the audio mode or telephony mode.

The cover may be arranged to extend across one or more faces of the electronic apparatus. The cover may be arranged to extend across a front face and a lateral face of the apparatus. The cover may be arranged to extend across a rear face of the apparatus.

The cover may be arranged to extend across a substantial portion of the width of a face of the electronic apparatus.

Movement of the cover to one or more of the cover positions may be detected by one or more mechanical, electrical and/or electromechanical sensors and/or associated processors.

The functions may include one or more of telephony functionality, camera functionality, and/or audio functionality. The camera functionality may allow the recording and/or playing of video and/or still images. The audio functionality may provide the playing/recording of audio (e.g. music of MP3 format or other formats), and the telephony functionality may provide voice and/or image transmission over an air interface and/or landline transmission system.

The apparatus may be a device module or a device. The apparatus may be a hand-held electronic device module or a hand-held electronic device.

The apparatus may be arranged such that one or more of the cover positions are arranged to cover all but one region of the user interface, the revealed region being associated with one particular functional mode of the apparatus. The apparatus may be arranged such that all of the cover positions cover all but one region of the user interface, the revealed region being associated with one particular functional mode of the apparatus.

The apparatus may comprise one or more regions of the user interface which are never coverable by the cover. These regions may not be associated with one particular function but may be common user interface regions to one or more functions. For example, all or part of one or more of an apparatus display may never be covered. The apparatus display may be the main and/or only display of the electronic device.

The apparatus may be arranged such that the cover is arranged to cover a portion of an apparatus display. This apparatus may be arranged such that this covered display portion is placed in an idle state when covered.

The cover may be a clear cover arranged to allow the user to see one or more covered regions, and/or parts of the regions, of the user interface.

One or more of the regions of the user interface associated with a particular functional mode may be a continuous region of the user interface. One or more regions of the user interface associated with a particular functional mode may be a discontinuous region of the user interface. The region may be a regularly shaped region such as a square/rectangle/oval/ellipse or an irregular shape e.g. L-shape.

According to a second aspect the present invention provides a portable electronic apparatus user interface for a portable electronic apparatus arranged to be able to perform a plurality of functions, one or more of a plurality of functions being selectively performable when the apparatus is placed in a corresponding functional mode, the user interface arranged to allow user operation of the plurality of functions, each of the functions being user operable using a particular region of the electronic apparatus user interface, the user interface comprising a user moveable cover arranged to be moveable into a plurality of positions, wherein each of the cover positions is associated with a particular functional mode of the apparatus and is arranged to cover one or more regions of the user interface not associated with the particular functional mode and to reveal one or more regions of the user interface associated with the particular functional mode.

According to a third aspect, the present invention provide computer code for controlling a user interface, the user interface for a portable electronic apparatus arranged to be able to perform a plurality of functions, one or more of a plurality of functions being selectively performable when the apparatus is placed in a corresponding functional mode, the user interface arranged to allow user operation of the plurality of functions, each of the functions being user operable using a particular region of the electronic apparatus user interface, the user interface comprising a user moveable cover arranged to be moveable into a plurality of positions, wherein each of the cover positions is associated with a particular functional mode of the apparatus and is arranged to cover one or more regions of the user interface not associated with the particular functional mode and to reveal one or more regions of the user interface associated with the particular functional mode, wherein the computer code is arranged to be used to associate cover positions with one or more functional modes of the apparatus.

One or more aspect, embodiments, features of aspects/embodiments in all various combinations or in isolation are within the present disclosure whether or not specifically mentioned in isolation or that combination. Corresponding means for performing the functions mentioned are also within the scope of the present disclosure.

BRIEF DESCRIPTION OF DRAWINGS

FIG. 2 shows the moveable cover 150 being sensed by one or more sensors which in turn provide one or more corresponding sensed signals to a signal processor for carrying out the present invention.

FIG. 3 shows an example of a signal processor such as shown in FIG. 2.

DETAILED DESCRIPTION OF EMBODIMENTS OF THE INVENTION

Figure 1:
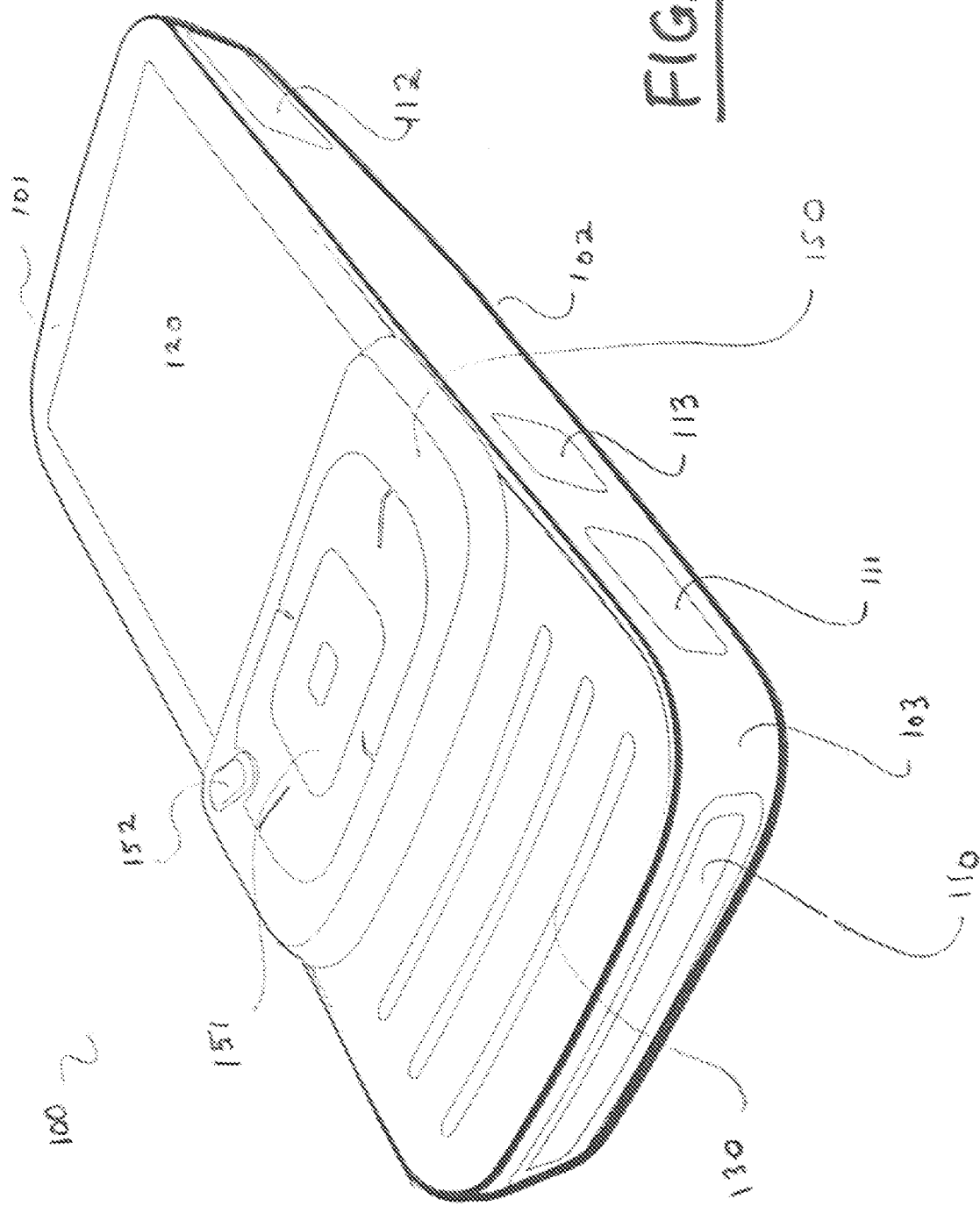
FIG. 1 illustrates one embodiment of a portable electronic device according to the present invention.

One embodiment of an electronic device according to the present invention is shown in FIG. 1. In the embodiment shown, the device 100 is a portable radiotelephone comprising spaced apart front face and rear faces 101, 102 which are joined together by a lateral perimeter wall 103.

The perimeter wall 103 comprises a number of user interface elements 110, 111, 112. In one embodiment these could include one or more ports 110 (e.g. a USB port) to allow physical connection to one or more electronic devices (including a port for receiving power to charge the rechargeable power supply (not shown) of the device 100), a window 111 for allowing the transmission of short range radio-transmissions to permit non-physical connection to a peripheral device (e.g. via Bluetooth™) over the air interface, and volume buttons 112.

In another embodiment, user interface element 110 is a speaker, 111 is a camera shutter key (camera window located on the reverse of device 100 is not shown), 113 is an imaging mode key providing a shortcut to the camera function (for example, moving the camera into an active state from an idle state and/or providing image options (view previous stored still/video images, take still/video image) for user selection), and 112 is a volume/zoom key.

The front face 101 comprises a number of user interface regions 130, 125 (not shown) and 120 placed adjacent to one another to extend from the base of the device 100 towards the top of the device 100 (along the longitudinal axis of the device 100). So, user interface region 130 is positioned towards the base of the device 100. Next to this region 130 is user interface region 125 (in the configuration of FIG. 1 it is covered by cover 150), and next to this region 125 is user interface region 120.

In the embodiment of FIG. 1, user interface region 130 is an alphanumeric keypad, region 125 is a QWERTY keypad, and region 120 is an electronic display. In another embodiment, each of the user interface regions may be display regions (separate displays of different regions of the same display), one or more of the regions allowing user input functionality (i.e. they are touch sensitive display regions). In another embodiment, the QWERTY keypad 125 may be part of the display 120 i.e. at least the lower region of the display 120 is touch sensitive. In other embodiments, the order of one or more of the regions may be different so, for example, the QWERTY keypad may be located towards the base of the device 100, and the alphanumeric keypad between the display and the QWERTY keypad.

In this embodiment, user interface region 130 is useable when make telephone calls, user interface region 125 is useable when writing emails/text messages and user interface region 120 is useable in both functional modes.

The cover 150 is arranged to be slideable along the longitudinal axis of the device 100 to cover one or more regions of the front face 101. In the present case, the cover 150 has two positions, the first overlying the user interface region 130 and the second overlying the user interface 125. The cover positions are detent positions which give the user the feeling that the cover 150 has positively reached a particular position associated with a particular function (and is not just at an intermediate position).

The size of the cover 150 is sufficient to cover user interface region 130 when in a first cover position without overlying user interface region 125, and to cover user interface region 125 when in the second cover position without overlying user interface region 130.

The cover 150 may have a third position where it overlies a lower region of the display 120 (or in another embodiment completely overlies the display 120). In one embodiment (not shown), the cover 150 may be arranged to extend around the lateral perimeter wall 103 to cover one or more of the user interface elements 110-112.

In the embodiment of FIG. 1, the cover 150 comprises user input element 151 which are commonly used in a number of different functional modes of the device 100. User input element 151 allows 4 way scrolling and also user selection (by depression). A media key 152 is also provided to provide a shortcut to one or more of the camera functions. For example, the shortcut could always be a shortcut to an audio function allowing the playing and/or recording of audio (e.g. music) and/or entering an audio mode which allows a user to browse a menu of audio items/functions which are selectable. The shortcut provided by the media key 152 may correspondingly change according to the position of the cover 150 on the device 100, so when the cover 150 is in a first position it may provide a different shortcut than when the cover 150 is in the second position, the shortcut leading to a different position in the menu of the user interface which controls the various functions of the device 100, the different position in the menu associated with the particular functions which are providable using the user interface regions which are not covered.

In one particular embodiment, movement of the cover 150 to cover user interface region 130 reveals the QWERTY keypad 125. This movement of the cover automatically moves the device 100 into an email/SMS mode in which the user is able to perform one or more email/SMS functions, such as compose an email/SMS. Movement of the cover 150 over the QWERTY keypad 125 automatically moves the device into a base mode in which the user is able to use the telephony functionality of the device 100. The user may also be able to use one or more of the device functions in this base mode (e.g. play audio).

In one embodiment, movement of the cover 150 to overlie the user interface region 130 may reveal a larger display 120 and automatically move the device 100 into a camera mode in which the user is able to capture one or more images.

In another embodiment, movement of the cover 150 to overlie the user interface region 130 may reveal a larger display 120 and automatically move the device 100 into a viewing mode in which the user is able to view one or more previously captured or received images.

The functional mode associated with the cover positions may be different according to the function currently being performed. For example, when making/receiving a telephone call, the movement of the cover to reveal a larger display may initiate video calling. On receipt of email with an attachment, movement to reveal a larger display may provide a larger display with which a user can view the attachment (which may be an image or a large text document). The user may be automatically given the option of opening the attachment and/or the email/SMS upon movement of the cover 150 to a particular position (which may be a position which provides a larger display).

The device 100 may be arranged such that the user interface region 130, 125, 120 change their appearance/functionality according to the position of the cover 150. For example, moving the cover 150 to reveal only the bottom row of user interface region 130 changes the user input functionality of the three key regions on the bottom from *0# to gaming key regions, such as "shoot", "duck" and "hide" in one particular gaming application. In such embodiment, the user interface regions could be touch sensitive displays which can allow a user to provide input and also change the content of what is displayed to indicate that a different input function is being provided. In another embodiment, the three key regions (*0#) on the bottom row could become a different number of key regions other than three (e.g. two or four key regions) when only the bottom row is revealed. Thus, the key regions do not have to provide a constant number of input regions in each of the cover positions.

It will be appreciated that various modifications can be made without departing from the scope of the present invention. For example, when the cover 150 reveals a large display 120, the device 100 could be triggered to enter a TV viewing mode and/or to show other video images (or still images) which may or may not be pre-recorded on the device (or pre-recorded on a removable memory e.g. memory card).

The device 100 of FIG. 1 includes a signal processor that is responsive to a signal generated by the movement of the moveable cover of the portable device which signal has a magnitude, phase or other characteristic indicative of such movement by the user of the device. A user of the portable electronic device will be able to change the functional mode of the portable electronic device by moving the user moveable cover into one of the plurality of positions. Each of the positions is associated with a corresponding functional mode of device and is arranged to cover one or more regions of a user interface of the device not associated with the corresponding functional mode and to reveal one or more regions of the user interface that is associated with the corresponding functional mode desired by the user. Once the desired one or more regions of the user interface is exposed, the user may operate the device in the corresponding functional mode by using the user interface associated with the corresponding functional mode. Thus, the user movable cover of the portable electronic device corresponds to means for changing a functional mode of the device by moving the cover and the user interface associated with the corresponding functional mode corresponds to means for operating the device in the corresponding functional mode by use thereof.

FIG. 2 shows a moveable cover 150 such as shown in FIG. 1 capable of moving in a sliding fashion as depicted in the figure. A sensor 200, which may be one or more sensors within the device 100, is able to sense movement of the moveable cover 150 as depicted by a sensor mechanism 202. The sensing mechanism may be mechanical, electrical, optical or the like. Upon sensing movement of the cover 150, the sensor 200 provides a signal on a line 204 to a signal processor 206 which is able to interpret the sensed signal on the line 204 in order to determine the position of the cover with respect to the body 101, 102, 103 of the overall device 100. For the example given, the sensor or sensors 200 can sense the sliding of the cover 150 over the region 130, the region 125, or the region 120. More details of the signal processor 206 is shown in FIG. 3 in the form of a general purpose signal processor containing components including a read only memory 208, a random access memory 210, a central processing unit 212, a clock 214, an input/output device 216, and other devices 218 all interconnected by data, address and control lines 220. As mentioned above, the signal processor 206 although shown as a general purpose signal processor, may take the form of a specific or dedicated signal processor in the form of an integrated circuit or other discrete component implementation of a signal processor as will be appreciated by those of skill in the art of implementing such signal processors in the form of software, hardware, firmware or some combination thereof.

One or more aspects, embodiments and/or features of one or more aspects and/or embodiments in isolation and in all various combinations are within the present disclosure whether or not specifically mentioned in isolation or in that combination. Corresponding means for performing the various functions are within the present disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus, comprising:
    a user interface configured to allow for user operation of a plurality of functions; and
    a user slideable cover configured to extend across a rear face of the apparatus and configured to be slideable between a first position and a second position, the first position being associated with a first functional mode of the apparatus and the second position being associated with a second functional mode of the apparatus, wherein
    when the user slideable cover is in the first position, the user slideable cover is configured to cover a first region of the user interface not associated with the first functional mode and to reveal a second region of the user interface associated with the first functional mode, and
    when the user slideable cover is in the second position, the user slideable cover is configured to cover at least a portion of the second region not associated with the second functional mode and to reveal at least a portion of the first region associated with the second functional mode, and wherein
    the user slideable cover comprises at least one user input element, and the apparatus is configured, when the user slideable cover is in the first position, to respond to user input at the at least one user input element by providing a shortcut to a first menu location, and the apparatus is configured, when the user slideable cover is in the second position, to respond to user input at the at least one user input element by providing a shortcut to a second menu location, different to the first menu location;
    wherein the apparatus is configured to respond to movement of the user slideable cover from the first position to the second position by changing the menu location associated with the at least one user input element.

2. The apparatus of claim 1, wherein the cover is configured to be slideable in a plane parallel to a front face of the apparatus.

3. The apparatus of claim 1, wherein the user slideable cover comprises one or more user output elements.

4. The apparatus of claim 3, wherein an output of the one or more user output elements depends upon whether the apparatus is in the first functional mode or the second functional mode.

5. The apparatus of claim 1, wherein the at least one user input element comprises at least one touch sensitive display.

6. The apparatus of claim 1, wherein the cover extends across more than one face of the apparatus.

7. The apparatus of claim 6, wherein the user slideable cover is configured to cover at least a portion of a front face of the apparatus, and at least a portion of a lateral wall of the apparatus.

8. The apparatus of claim 7, wherein the lateral wall of the apparatus comprises at least one user input element that is coverable by the user slideable cover.

9. The apparatus of claim 1, wherein the apparatus comprises at least one sensor configured to detect when the user slideable cover is in the first position, and when the user slideable cover is in the second position.

10. The apparatus of claim 1, wherein the apparatus is a hand-held portable electronic apparatus.

11. The apparatus of claim 1, wherein the user interface comprises a third region that is not coverable by the user slideable cover.

12. The apparatus of claim 11, wherein the third region comprises a display.

13. The apparatus of claim 1, wherein the first region of the user interface comprises at least a portion of a display, and the apparatus is configured to place the portion of the display in an idle state when the apparatus is in the first functional mode.

14. The apparatus of claim 1, wherein the first region of the user interface comprises a first plurality of user input elements, the second region of the user interface comprises a second plurality of user input elements, and wherein when the user slideable cover is in the first position, the first plurality of user input elements are covered and the second plurality of user input elements are revealed, and when the user slideable cover is in the second position, at least a portion of the first plurality of user input elements are revealed and at least a portion of the second plurality of user input elements are covered.

15. The apparatus of claim 1, wherein the apparatus is configured to respond to movement of the user slideable cover from the second position to the first position by placing the apparatus into the first functional mode.

16. The apparatus of claim 1, wherein the apparatus is configured to respond to movement of the user slideable cover from the first position to the second position by configuring the at least one user input element to perform, in response to user input, the second function.

17. The apparatus of claim 16, wherein the apparatus is configured to respond to movement of the user slideable cover from the second position to the first position by configuring the at least one user input element to perform, in response to user input, the first function.

18. The apparatus of claim 1, wherein the first region comprises a QWERTY keypad and the second region comprises a display, such that when the apparatus is in the first position, the QWERTY keypad is hidden and the display is revealed, and when the apparatus is in the second position, a portion of the display is hidden and the QWERTY keypad is revealed.

19. The apparatus of claim 1, wherein the at least one user input element is configured to perform a scrolling operation.

20. A user interface comprising:
    a user interface configured to allow for user operation of a plurality of functions of an apparatus; and
    a user slideable cover configured to extend across a rear face of the apparatus and configured to be slideable between a first position and a second position, the first position being associated with a first functional mode of the apparatus and the second position being associated with a second functional mode of the apparatus, wherein when the user slideable cover is in the first position, the user slideable cover is configured to cover a first region of the user interface not associated with the first functional mode and to reveal a second region of the user interface associated with the first functional mode, and when the user slideable cover is in the second position, the user slideable cover is configured to cover at least a portion of the second region not associated with the second functional mode and to reveal at least a portion of the first region associated with the second functional mode, and wherein the user slideable cover comprises at least one user input element for causing the apparatus to provide a shortcut to a first menu location when the user slideable cover is in the first position and for causing the apparatus to provide a shortcut to a second menu location, different to the first menu location, when the user slideable cover is in the second position;

wherein the apparatus is configured to respond to movement of the user slideable cover from the first position to the second position by changing the menu location associated with the at least one user input element.

21. A computer readable memory stored with code which, when executed by a processor, causes an apparatus to:

associate a first functional mode with a first position of a user slideable cover and a second functional mode with a second position of a user slideable cover which is configured to extend across a rear face of the apparatus, wherein when the user slideable cover is in the first position, the user slideable cover is configured to cover a first region of a user interface not associated with the first functional mode and to reveal a second region of the user interface associated with the first functional mode, and when the user slideable cover is in the second position, the user slideable cover is configured to cover at least a portion of the second region not associated with the second functional mode and to reveal at least a portion of the first region associated with the second functional mode;

respond to user input at an input element of the user slideable cover, when the user slideable cover is in the first position, by providing a shortcut to a first menu location;

respond to user input at the input element of the user slideable cover, when the when the user slideable cover is in the second position, by providing a shortcut to a second menu location, different to the first menu location; and respond to movement of the user slideable cover from the first position to the second position by changing the menu location associated with the at least one user input element.

22. The computer readable memory of claim 21, wherein the code causes the apparatus to respond to movement of the user slideable cover from the second position to the first position by placing the apparatus into the first functional mode.

23. An apparatus comprising:

a user interface;

a user slideable cover slideable between a first position and a second position and configured to extend across a rear face of the apparatus, the first position being associated with a first functional mode of the apparatus and the second position being associated with a second functional mode of the apparatus;

means for associating a first functional mode with the first position of the user slideable cover and a second functional mode with the second position of the user slideable cover, wherein when the user slideable cover is in the first position, the user slideable cover is configured to cover a first region of a user interface not associated with the first functional mode and to reveal a second region of the user interface associated with the first functional mode, and when the user slideable cover is in the second position, the user slideable cover is configured to cover at least a portion of the second region not associated with the second functional mode and to reveal at least a portion of the first region associated with the second functional mode;

means for responding to user input at an input element of the user slideable cover, when the user slideable cover is in the first position, by providing a shortcut to a first menu location;

means for responding to user input at the input element of the user slideable cover, when the when the user slideable cover is in the second position, by providing a shortcut to a second menu location, different to the first menu location; and means for responding to movement of the user slideable cover from the first position to the second position by changing the menu location associated with the at least one user input element.

24. A method comprising:

associating a first functional mode with a first position of a user slideable cover and a second functional mode with a second position of a user slideable cover which is configured to extend across a rear face of the apparatus, wherein when the user slideable cover is in the first position, the user slideable cover is configured to cover a first region of a user interface not associated with the first functional mode and to reveal a second region of the user interface associated with the first functional mode, and when the user slideable cover is in the second position, the user slideable cover is configured to cover at least a portion of the second region not associated with the second functional mode and to reveal at least a portion of the first region associated with the second functional mode;

responding to user input at an input element of the user slideable cover, when the user slideable cover is in the first position, by providing a shortcut to a first menu location;

responding to user input at the input element of the user slideable cover, when the when the user slideable cover is in the second position, by providing a shortcut to a second menu location, different to the first menu location; and responding to movement of the user slideable cover from the first position to the second position by changing the menu location associated with the at least one user input element.

25. The method of claim 24, further comprising: responding to movement of the user slideable cover from the second position to the first position by placing the apparatus into the first functional mode.

26. An apparatus, comprising:

a processor; and memory including software, the memory and the computer program code configured to, with the processor, cause the apparatus at least to perform:

respond to user input at least one user input element of a user slidable cover which is configured to extend across a rear face of the apparatus when the user slidable cover is in a first position that covers a first region of a user interface and reveals a second region of the user interface by providing a shortcut to a first menu location, and respond to user input at the at least one user input element when the user slidable cover is in a second position that covers a second region of the user interface and reveals the first region of the user interface by providing a shortcut to a second menu location, different to the first menu location; and respond to movement of the user slideable cover from the first position to the second position by changing the menu location associated with the at least one user input element, wherein the user interface allows for user operation of a plurality of functions, the first position is associated with a first functional mode of the apparatus wherein the slidable cover covers a first region of the user interface not associated with the first functional mode and reveals a second region of the user interface associated with the first functional mode, the second position is associated with a second functional mode of the apparatus wherein the slidable cover is configured to cover at least a portion of the second region not associated with a second functional mode and to reveal at least a portion of the first region associated with the second functional mode.

* * * * *